US 8,644,389 B2

(12) United States Patent
Chengalvala et al.

(10) Patent No.: US 8,644,389 B2
(45) Date of Patent: Feb. 4, 2014

(54) REAL-TIME VIDEO IMAGE PROCESSING

(75) Inventors: Vivekanand Chengalvala, Montgomery Village, MD (US); Ran Katzur, Germantown, MD (US); Djordje Senicic, Belgrade (RS)

(73) Assignee: Texas Instruments Incorporated, Dallas, TX (US)

( * ) Notice: Subject to any disclaimer, the term of this patent is extended or adjusted under 35 U.S.C. 154(b) by 954 days.

(21) Appl. No.: 12/729,499

(22) Filed: Mar. 23, 2010

(65) Prior Publication Data

US 2010/0290528 A1    Nov. 18, 2010

Related U.S. Application Data

(60) Provisional application No. 61/178,560, filed on May 15, 2009.

(51) Int. Cl.
*H04B 1/66* (2006.01)
*H04N 7/12* (2006.01)
*H04N 11/02* (2006.01)
*H04N 11/04* (2006.01)
*H04N 7/26* (2006.01)

(52) U.S. Cl.
CPC .............................. *H04N 19/00127* (2013.01)
USPC .................................................... 375/240.16

(58) Field of Classification Search
None
See application file for complete search history.

(56) References Cited

U.S. PATENT DOCUMENTS

| | | | |
|---|---|---|---|
| 5,768,536 A * | 6/1998 | Strongin et al. | 709/247 |
| 6,192,148 B1 * | 2/2001 | Lin | 382/166 |
| 6,366,705 B1 * | 4/2002 | Chiu et al. | 382/239 |
| 7,305,036 B2 * | 12/2007 | MacInnis et al. | 375/240.25 |
| 7,379,607 B2 | 5/2008 | Srinivasan et al. | |
| 8,155,196 B2 * | 4/2012 | Lee | 375/240.16 |
| 2007/0140344 A1 | 6/2007 | Shima | |
| 2008/0240248 A1 * | 10/2008 | Lee et al. | 375/240.16 |
| 2008/0247466 A1 * | 10/2008 | Wang et al. | 375/240.16 |
| 2010/0232507 A1 * | 9/2010 | Cho et al. | 375/240.16 |

OTHER PUBLICATIONS

U.S. Appl. No. 12/564,532, filed Sep. 22, 2009, Chengalvala et al.
U.S. Appl. No. 11/739,462, filed Apr. 24, 2007, Madumbu.
U.S. Appl. No. 61/170,393, Apr. 17, 2009, Katzur et al.

* cited by examiner

*Primary Examiner* — Nhon Diep
(74) *Attorney, Agent, or Firm* — Steven A. Shaw; Wade James Brady, III; Frederick J. Telecky, Jr.

(57) ABSTRACT

A video processing device includes a video preprocessor and a video processor. The video processor is configured to facilitate inputting preprocessed digital video data ready for further processing by an encoder or a transcoder, compressing the preprocessed digital video data to form compressed digital video data, and outputting the compressed digital video data. The video preprocessor operable to receive digital video raw data, configured to facilitate preprocessing a macroblock of the digital video raw data so as to output the preprocessed digital video data ready for an encoder or transcoder of the video processor when the macroblock does not indicate SKIP, and not preprocessing the macroblock of the digital video raw data when the macroblock is a SKIP macroblock indicating SKIP, but jumping to process the SKIP macroblock by an entropy encoder of the video processor instead.

20 Claims, 8 Drawing Sheets

REAL-TIME VIDEO IMAGE PROCESSING

CROSS-REFERENCE TO RELATED APPLICATIONS

This application claims the benefit of the following Provisional application: 61/178,560 filed May 15, 2009 which is expressly incorporated herein by reference.

TECHNICAL FIELD

The technical field relates in general to video processing, and more specifically to real-time image processing as part of video processing.

BACKGROUND

Many video processing systems perform image processing as a part of the video processing system. This image processing can include and not be limited to image trans-sizing, inserting watermarks, image smoothing, alpha blending, image enhancement, edge enhancement, image restoration, special effects, format conversion and more. Image processing enhancement can be a critical operation for many medical imaging systems.

Image processing methods can be used in video encoding systems in which raw video data is processed before a compression scheme is applied. In addition, image processing methods can be used in transcoding systems in which a stream of compressed video is decoded, image processing methods are applied to each frame of the video stream, and the result is compressed again to generate a different stream of compressed video.

A major problem of applying image processing techniques in real-time encoder or transcoder systems is the processing load that it requires. The processing load of an image processing application requires adding more processors to the encoder or transcoder systems, and results in additional cost.

SUMMARY

Accordingly, one or more embodiments provide a video processing device, a method for processing a video image, and/or a non-transitory computer-readable medium comprising instructions for execution by a computer, the instructions including a computer-implemented method for processing a video image. The video processor can be configured to facilitate inputting preprocessed digital video data ready for further processing by an encoder or a transcoder, compressing the preprocessed digital video data to form compressed digital video data, and outputting the compressed digital video data. The video preprocessor can be operable to receive digital video raw data, and can be configured to facilitate (a) preprocessing a macroblock of the digital video raw data so as to output the preprocessed digital video data ready for an encoder or transcoder of the video processor when the macroblock does not indicate SKIP, and (b) not preprocessing the macroblock of the digital video raw data when the macroblock is a SKIP macroblock indicating SKIP, but jumping to process the SKIP macroblock by an entropy encoder of the video processor instead.

According to a further embodiment, the video preprocessor is configured to jump to process the SKIP macroblock by the entropy encoder before any image processing operation is applied thereto.

According to a still further embodiment, the SKIP indicator has an adaptive threshold, so as to jump to process the SKIP macroblock only when the video processor requires more resources than the video preprocessor.

In yet another embodiment, original preprocessed raw data is used by the video preprocessor as an original reference frame to determine whether the macroblock in the digital video raw data is the SKIP macroblock.

In a still further embodiment, the video processor performs reconstruction and de-blocking of the preprocessed digital video data to provide compressed digital video data, and a reconstructed but un-deblocked reference frame is used instead of a deblocked reconstructed reference frame to perform deblocking filtering for SKIP macroblocks.

A further embodiment provides for using a de-blocked and reconstructed reference frame to perform a motion estimation operation.

Yet another embodiment provides an apparatus configured to perform the method discussed herein.

Still another embodiment provides a non-transitory computer readable medium comprising executable instructions for performing the method discussed herein.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, which are not necessarily drawn to scale, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1A:
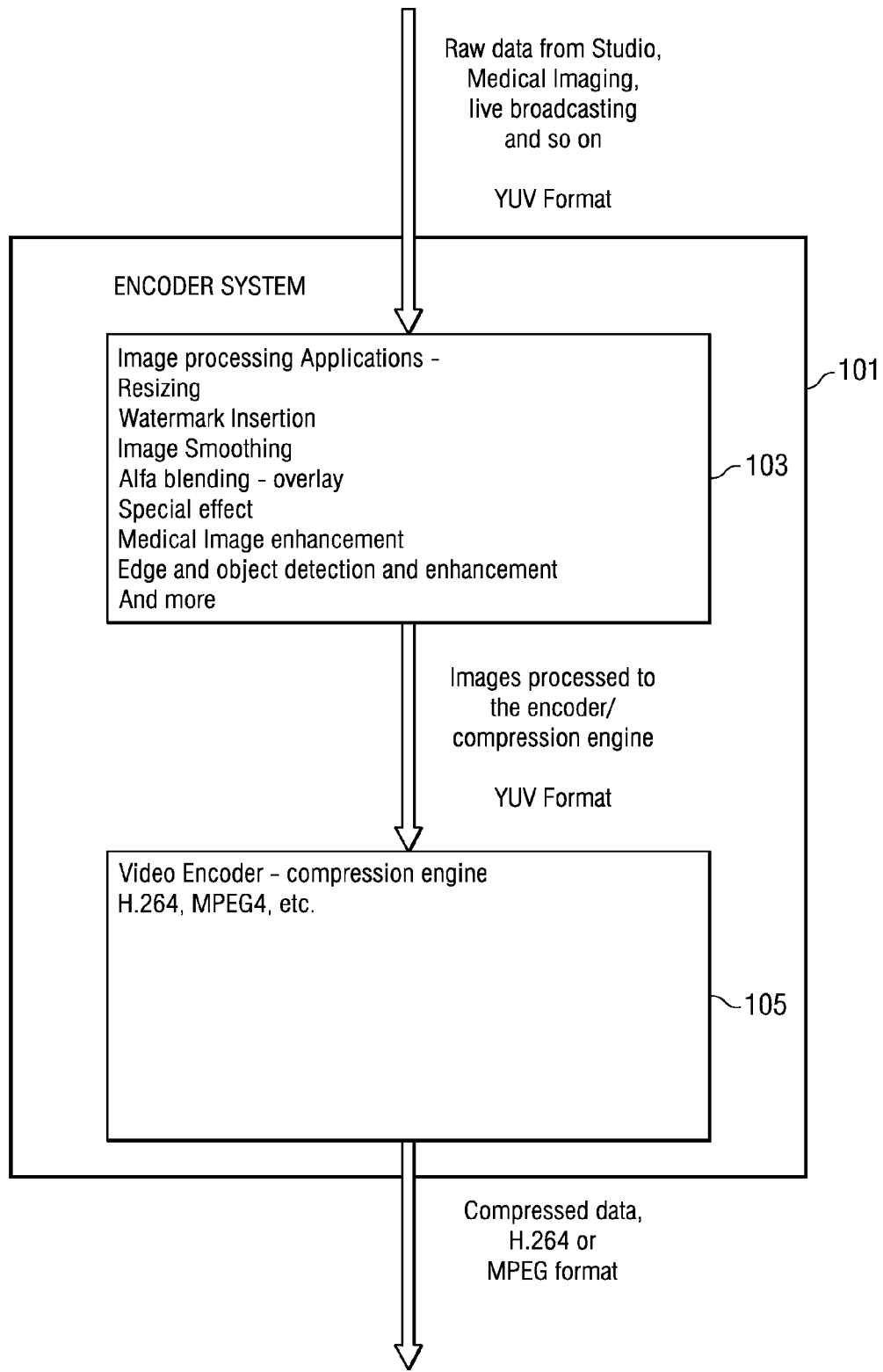
FIGS. 1A and 1B are block diagrams illustrating video encoder and video transcoder systems, respectively, that utilize various types of image processing applications.

In overview, the present disclosure concerns video signal processing, such as may be associated with video processing devices. Such video signal processing can perform image processing, which is typically performed on images provided in digital form. Particularly, various inventive concepts and principles are embodied in systems, devices, and methods therein for providing real-time digital video signal processing, and more particularly systems, devices and methods for real-time image processing as part of video processing.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

U.S. Provisional Ser. No. 60/746,931 filed May 10, 2006 (incorporated in U.S. Ser. No. 11/739,462 filed Apr. 24, 2007) and U.S. Provisional Ser. No. 61/170,393 filed Apr. 17, 2009 (all incorporated herein by reference) offer methods to use early skip indication (ESI) to reduce processing load for video encoding processing. The present document can use ESI to reduce processing load associated with many image processing applications as mentioned herein.

Image processing applications can be divided into four classes. Atomic pixel processing algorithms are algorithms that process each pixel independently of other pixels. An example of such algorithm is a global changing of the Luma component to change the amount of light in the picture, or histogram equalization. A second class of algorithms is algorithms that are contained inside 16×16 macroblocks. A typical example of this is transcoding either homogeneous or heterogenuous. A third class of image processing algorithms is algorithms that in order to process a macroblock may use values that are on the boundary of the macroblock. A typical example is 2D filtering based on 3×3 or 5×5 kernels. In that case, ESI macroblocks (MB) can be increased for the size of the applied kernel—e.g., instead of 16×16 MB, 21×21 MB should be used. The last class of image processing algorithms is all the algorithms that are not included in the previous three classes.

Further in accordance with exemplary embodiments, there are described herein various inventive principles and combinations thereof that can be advantageously employed to provide an image processing system that is part of video encoder system or video transcoding system with a method to use an adaptive ESI (Early SKIP Indicator) to reduce processing load and as a result to enable building a more cost effective encoder or transcoder system. The method that is described here can be applied directly to image processing algorithms that are in the first and second class of algorithm discussed herein. An enhanced method can be applied to algorithms that are in the third class.

Embodiments provide an image processing system that is part of video encoder system or video transcoding system with a method that can use an adaptive ESI (early SKIP indicator) to reduce processing load and as a result to enable building a more cost effective encoder or transcoder system.

Figure 1B:
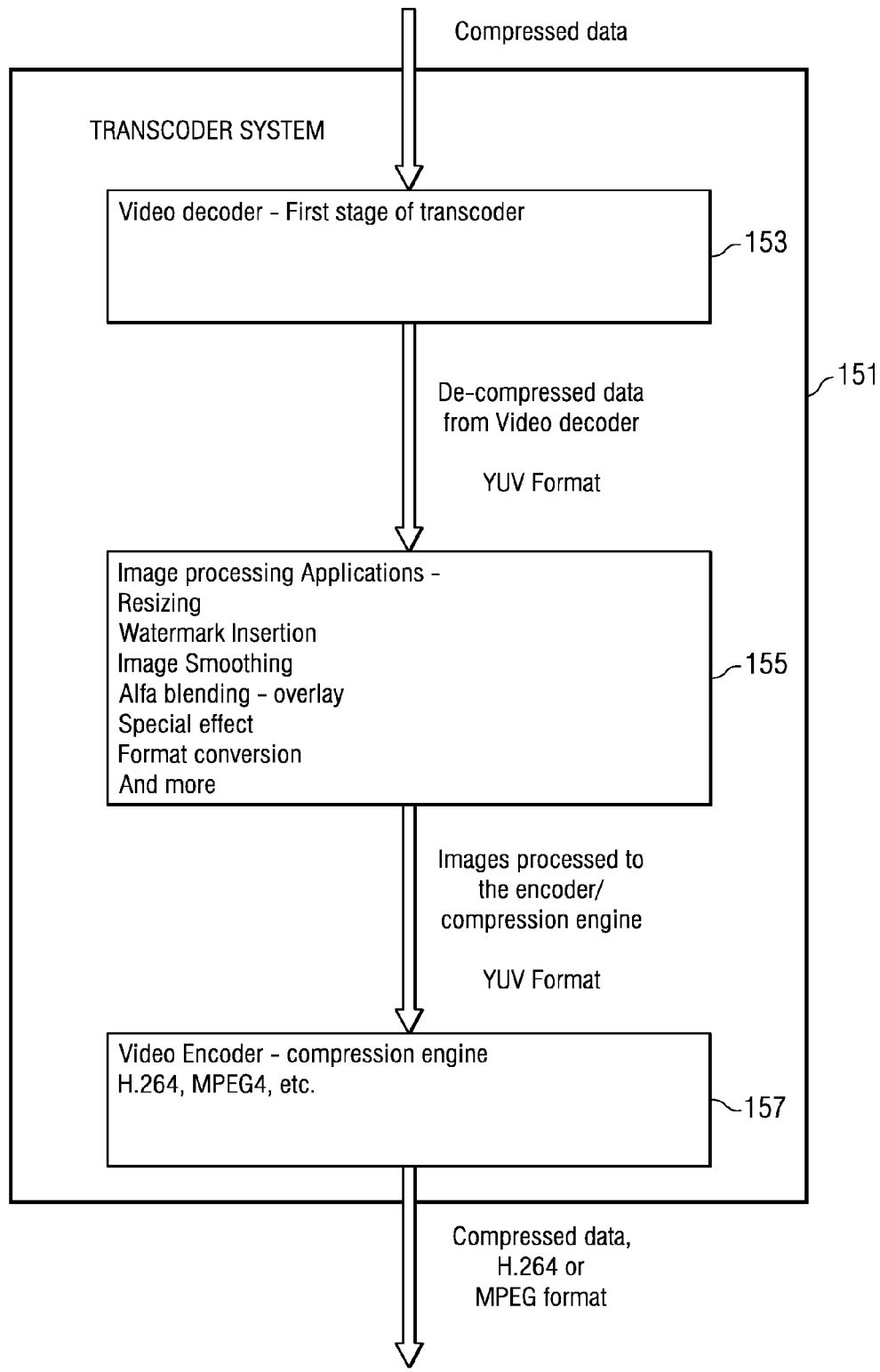

Referring now to FIGS. 1A and 1B, block-diagrams illustrating video encoder and video transcoder systems, respectively, that utilize various types of image processing applications will be discussed and described. A preferred embodiment of image processing methods that is part of a video encoding or video transcoding system can provide processing load reduction using early SKIP indicator to bypass processing of some macroblock and thus reduce the overall system processing load.

FIG. 1A illustrates a block diagram of a typical image processing system as part of a video encoder system. As illustrated, an encoder system 101 includes image processing applications 103 and a video encoder—compression engine 105. Raw data from a studio, medical imaging, live broadcasting, and the like is input, for example in conventional YUV format, into the encoder system 101.

The raw data representing the image is processed by one or more image processing applications 103, according to well known techniques. The image processing application can include, by way of example, resizing, watermark insertion, image smoothing, alpha blending—overlay, special effects, medical image enhancement, edge and/or object detection and/or enhancement, and the like.

The image data which has been processed is then input by the video encoder—compression engine 105. The data is processed according to a video encoding standard, for example, H.264, MPEG4, and the like, to produce compressed data in the particular format. The processed data can be transmitted, for example by a broadcaster, as is well understood.

FIG. 1B illustrates a block diagram of a typical image processing system as part of a video transcoding system. A video transcoder system 151 can included, for example, at a television receiver, or similar (further discussed below). The illustrated transcoder system 151 includes a video decoder 153, image processing applications 155, and a video encoder 157—compression engine 157. Compressed data is input into the transcoder system 151.

The compressed data representing the image is processed by the video decoder 153, which is the first stage of a transcoder, to produce de-compressed data. The de-compressed data from the video decoder can be in YUV format, and is processed by one or more image processing applications 155, according to well known techniques. The image processing application can include, by way of example, resizing, watermark insertion, image smoothing, alpha blending—overlay, special effects, format conversion, and the like.

The image data which has been processed is then input by the video encoder—compression engine 157. The data is processed according to a video encoding standard, for example, H.264, MPEG4, and the like, to produce compressed data in the particular format.

Preferred embodiment systems (e.g., studio video equipment, medical imaging equipment, video distribution equipment etc.) can perform preferred embodiment methods with any of several types of hardware, such as digital signal processors (DSPs), general purpose programmable processors, application specific circuits, or systems on a chip (SoC) such as multi-core processor arrays or combinations such as a DSP and a RISC processor together with various specialized programmable accelerators. A stored program in an onboard or external (flash EEP) ROM or FRAM could implement the signal processing methods. Analog-to-digital and digital-to-analog converters can provide coupling to the analog world; modulators and demodulators (plus antennas for air interfaces such as for video on cellphones) can provide coupling for transmission waveforms; and packetizers can provide formats for transmission over networks. The preferred embodiment image processing video encoding and video transcoding method is a real-time system with limited processing resources. The preferred embodiment method may utilize the available resources. A great amount of quality degradation can occur if the real time encoder processing requires more resources than the preferred embodiment has.

Figure 1C:
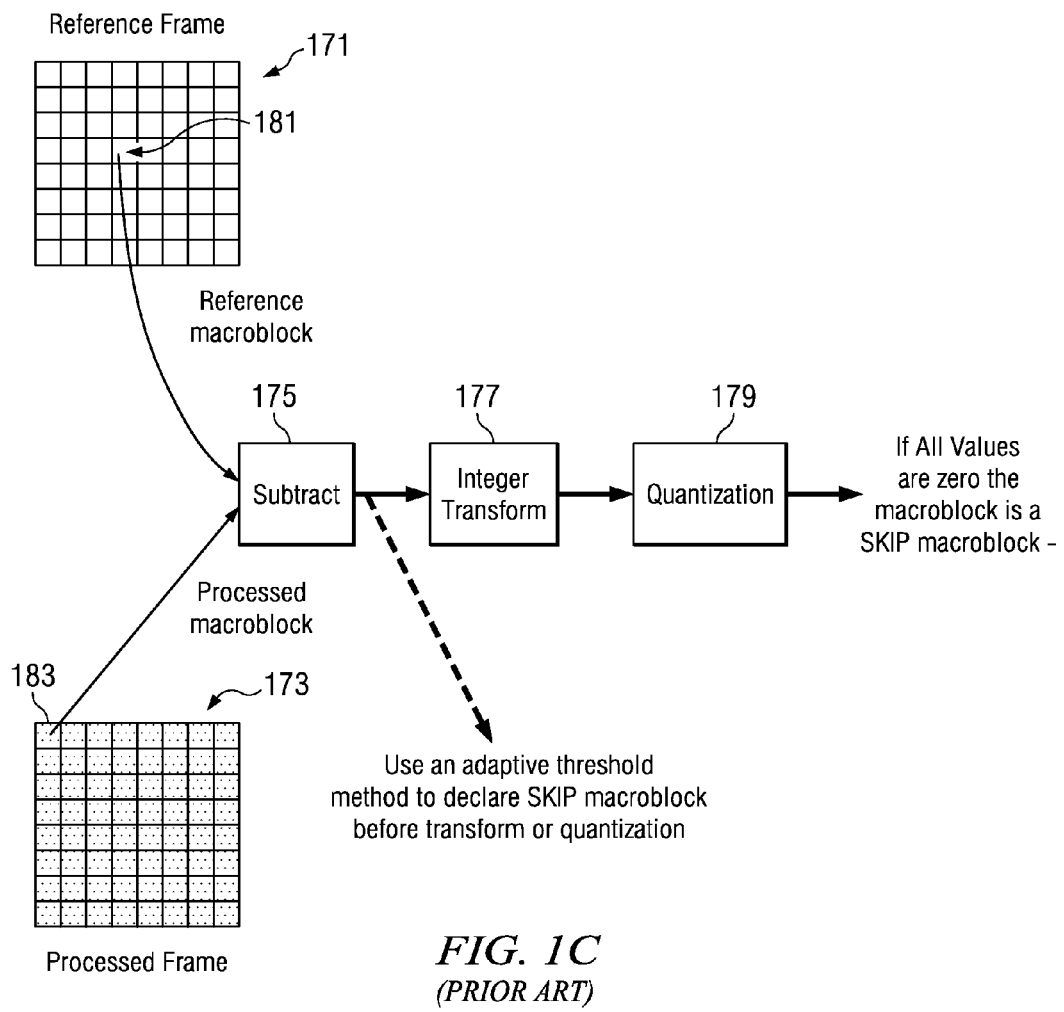
FIG. 1C is a block diagram illustrating the concept of a SKIP macroblock.

Referring now to FIG. 1C, a block diagram illustrating the concept of a conventional SKIP macroblock will be discussed and described with reference to image processing load.

Illustrated in FIG. 1C are a reference frame 171 with a reference macroblock 181, a processed frame 173 with a processed macroblock 183, a subtract circuit or process 175, an integer transform circuit or process 177, and a quantization circuit or process 179. The processed macroblock 183 is processed by the subtract circuit or process 175. A known adaptive threshold method can be used to declare a SKIP macroblock before the integer transform 177 and quantization 179 are performed, to avoid processing macroblocks which are not sufficiently different from the reference macroblock 181. A macroblock which is not declared as a SKIP prior to integer transform 177 and quantization 179 may be declared to be a SKIP macroblock after quantization 179, if all of the values are zero, according to known techniques.

The SKIP macroblock concept was introduced by the H.264 video compression standard and was extended by a U.S. provisional Ser. No. 60/746,931 filed on May 10, 2006. If the processed macroblock 183 is sufficiently similar to the reference macroblock 181 to the extent that the values of the quantized transform of the differences between the processed macroblock and the reference macroblock are all essentially zero, then the only information needed to reconstruct the macroblock is the location of the reference macroblock.

Figure 2A:
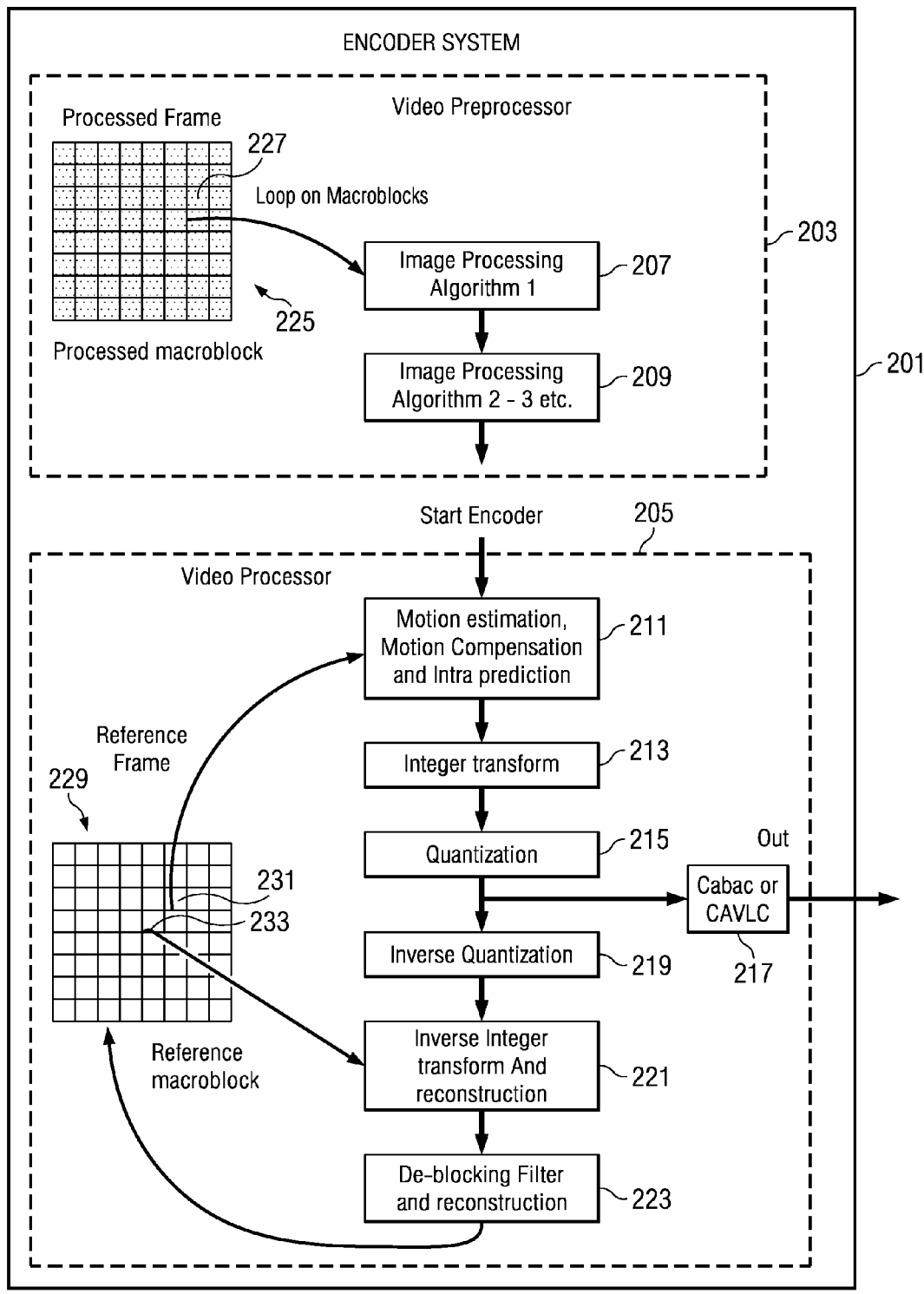
FIG. 2A-2B are flow diagrams illustrating macroblock encoder and transcoding processing, respectively.
Figure 2B:
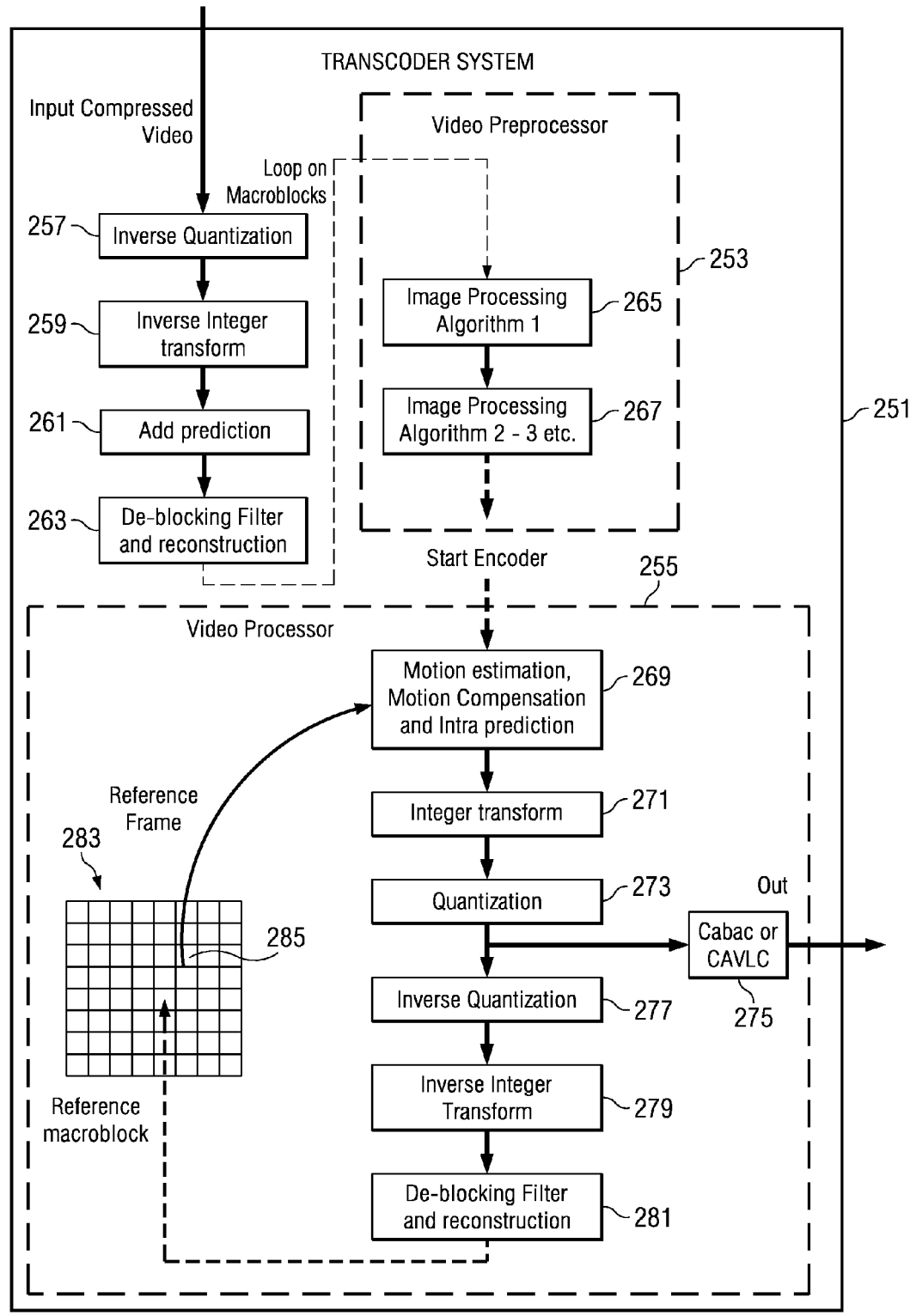

Referring now to FIG. 2A-2B, flow diagrams illustrating macroblock encoder and transcoding processing, respectively will be discussed and described. FIGS. 2A and 2B illustrated conventional encoder and transcoding processing, and hence much of the description will be omitted.

In FIG. 2A, an encoder system 201 includes a video preprocessor 203 and a video processor 205. Conventionally, the video preprocessor 205 receives a processed frame 225 which includes a processed macroblock 227. The video preprocessor 203 can perform one or more image processing algorithms, such as image processing algorithm 1 207 and image processing algorithm 3 209, on the macroblock, to output a preprocessed macroblock. The image processing algorithms 207, 209 are optional and are application dependent.

The preprocessed macroblock is input to the video processor 205, which performs motion estimation, motion compensation and/or intra prediction 211 on the macroblock using a deblocked, reconstructed macroblock 231 from a reference frame 229, in accordance with known techniques. Then the video processor 205 performs integer transform 213 and quantization 215 on the macroblock. Then, an entropy encoder such as the illustrated CABAC (context-adaptive binary arithmetic encoding) or CAVLC (context adaptive variable length coding) 217 (or other type of entropy encoder, e.g., VLC (variable length coding)) is performed on the macroblock output from the quantization 215. The video processor 205 performs inverse quantization 219, inverse integer transform and reconstruction 221 on the macroblock output from the quantization 215; the inverse integer transform and reconstruction utilizes a deblocked, reconstructed macroblock 233 from the reference frame in accordance with conventional techniques. The video processor 205 then performs de-blocking and re-construction 223 on the macroblock output from the quantization 215, to provide a deblocked, reconstructed macroblock which is stored as part of the reference frame 229 used for motion estimation, motion compensation and intra prediction 211 and reconstruction 221 as discussed above.

In FIG. 2B, a transcoder system 251 includes a video preprocessor 253 and a video processor 255. Conventionally, compressed video is input to an inverse quantization 257, an inverse integer transform 259, an add prediction 261, and a de-blocking filter and re-construction 263, which is input to the video preprocessor 253. The video preprocessor 253 receives a processed frame, and can perform one or more image processing algorithms, such as image processing algorithm 1 265 and image processing algorithm 3 267, on the macroblock, to output a preprocessed macroblock.

The preprocessed macroblock is input to the video processor 255, which performs motion estimation, motion compensation and/or intra prediction 269 on the macroblock using a deblocked, reconstructed macroblock 285 from a reference frame 283, in accordance with known techniques. Then the video processor 205 performs integer transform 271 and quantization 273 on the macroblock. Then, an entropy encoder such as the illustrated CABAC or CAVLC 275 is performed on the macroblock output from the quantization 273. The video processor 253 performs inverse quantization 277, inverse integer transform 279, and de-blocking and re-construction 281 on the macroblock output from the quantization 273, to provide a deblocked, reconstructed macroblock which is stored as part of the reference frame 283 used for motion estimation, motion compensation and intra prediction 269 as discussed above.

Figure 3:
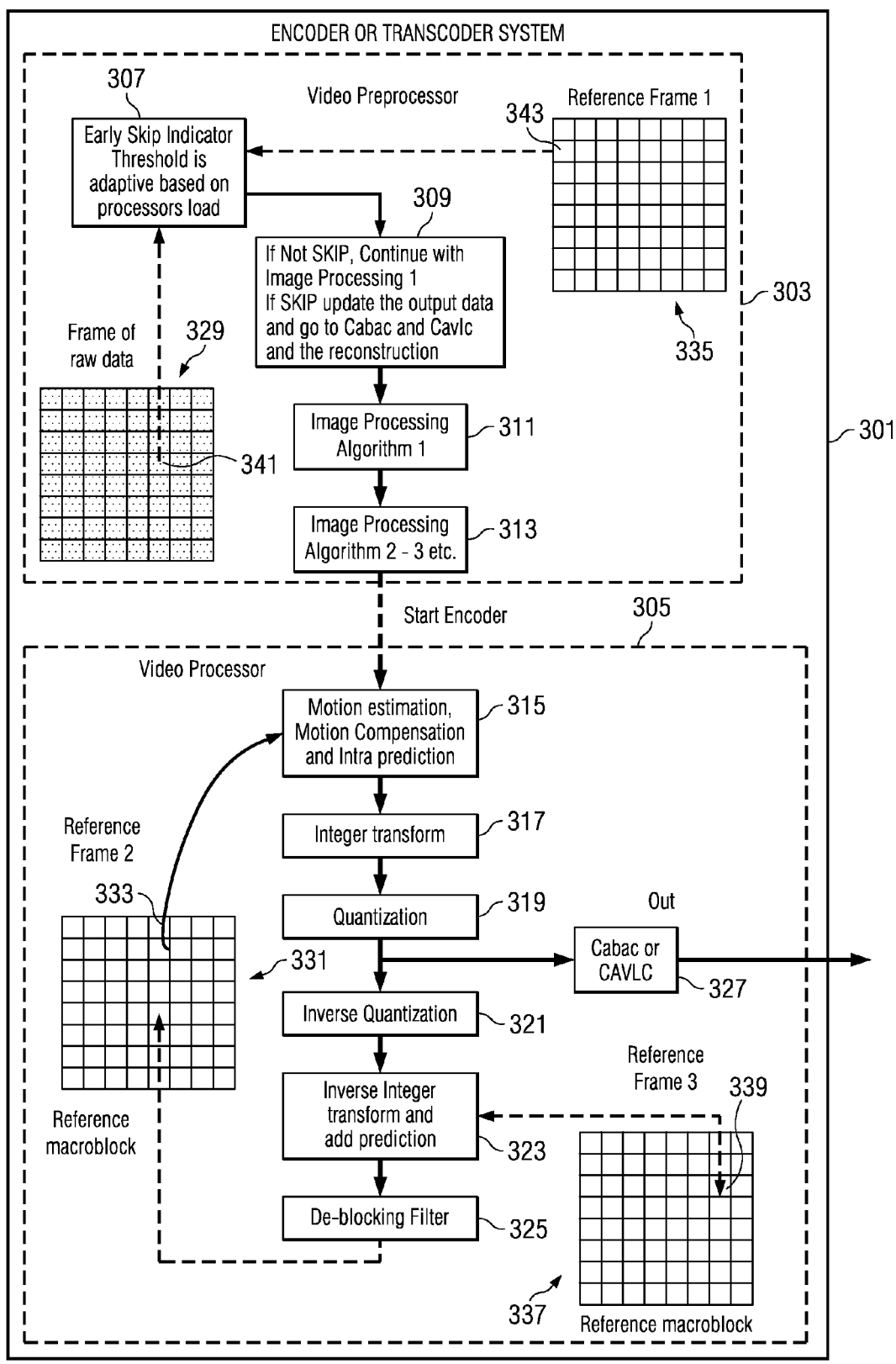
FIG. 3 is a flow diagram illustrating an encoder or transcoder system.

Referring now to FIG. 3, a flow diagram illustrating an encoder or transcoder system will be discussed and described. Embodiments may present an improvement of the above concepts and observations as follows. In overview, if a macroblock is determined to be a SKIP macroblock with a given reference macroblock, performing any image processing operation on the macroblock is redundant in the sense that the result will be the same as performing the same image processing on the reference macroblock. Hence, the image processing can be omitted for a SKIP macroblock.

FIG. 3 can illustrate image processing as part of an encoder system. The description for a transcoding system is similar. The image processing applications can be done on macroblock order. An early SKIP indicator block can be inserted in the image processing application block before the first image processing operation is applied. The early SKIP indicator can have an adaptive threshold based on the processing load of all processors in the system, similar to the block that was described in U.S. provisional No. 61/160,393. Other known techniques can be utilized to determine whether the macroblock is a SKIP macroblock.

For each macroblock the ESI block can determine if the macroblock is a SKIP macroblock or not. If a macroblock is defined as a SKIP macroblock, no image processing application will be applied thereto.

A reference frame will be stored in a memory in multiple presentations.

The first presentation will have the original reference frame. The original reference frame (one or more) can be used to determine the SKIP status of a processed macroblock.

The second presentation can be the reconstructed reference frame that will be used for motion estimation operation for non-SKIP macroblocks.

A third presentation of a reference frame can be the un-deblocked reconstructed frame. This frame can be used to perform deblocking filtering for macroblocks that are SKIP macroblocks or border SKIP macroblocks.

Here there is illustrated an encoder system 301 including a video preprocessor 303 and a video processor 305; the encoder system 301 is also representative of a transcoder system and one of skill in the art will readily understand which elements thereof have been omitted from the following description. The video preprocessor 303 includes image processing algorithms 1-3 311, 313. The video preprocessor 305 can receive a frame of raw data 329 which can include a macroblock 341. The video preprocessor 303 can perform one or more of the image processing algorithms 311, 313 on the macroblock, to output a preprocessed macroblock. Although two image processing algorithms 311, 313 are illustrated, they are optional and are representative of any number of image processing algorithms which are performed before an encoder is started on the macroblock. The image processing is referred to herein as "preprocessing" and the macroblock which is thereby produced is referred to herein as "preprocessed" or a "preprocessed macroblock."

In contrast to the video preprocessors discussed in connection with FIG. 2A-2B, here the video preprocessor 303 does not process the macroblock 341 when the macroblock 341 is a SKIP macroblock. Also in comparison to FIG. 2A-2B, the video preprocessor 303 uses a stored original reference frame 335 which is original data, that is, the reference frame is original preprocessed reference data stored before the preprocessing.

In FIG. 3, an early SKIP indicator used to bypass the preprocessing, e.g., image processing, can be used in the video preprocessor 303 and can be based on a reference macroblock 343 in the original reference frame 335. In FIG. 2A-2B, in contrast, the reference frame is not used until the video processor, so that image processing is sometimes needlessly performed. Furthermore, in FIG. 3, when the macroblock is a SKIP macroblock, the macroblock processing jumps to the entropy encoder 327 of the video processor 305.

The preprocessed macroblock is input to the video processor 305, which performs motion estimation, motion compensation and/or intra prediction 315 on the macroblock using a deblocked, reconstructed macroblock 333 from a reference frame 331, in accordance with known techniques. Then the video processor 305 performs integer transform 317 and quantization 319 on the macroblock. Then, an entropy encoder such as the illustrated CABAC or CAVLC 327 is performed on the macroblock output from the quantization 319. The video processor 305 performs inverse quantization 321, inverse integer transform and add prediction 323 on the macroblock output from the quantization 319; the inverse integer transform and reconstruction utilizes an un-deblocked, reconstructed macroblock 339 from the reference frame 337 when the macroblock is a SKIP macroblock. The video processor 305 then performs de-blocking 325 on the macroblock, to provide a deblocked, reconstructed macroblock which is stored as part of the reference frame 331 used for motion estimation, motion compensation and intra prediction 315 as discussed above.

Reference is now made to image processing algorithms that are part of the third class (discussed above). A new set of coefficient and the boundary strength algorithm of the deblocking filter can be defined as part of the negotiation between the encoder and the decoder and can be used instead of the standard deblocking filter. The new filter can perform the image processing filtering operation on the boundary of the macroblock as well is the standard deblocking filter. Note that because of the macroblock processing order, image processing compensation operation may modify the processed macroblock and macroblock to its left and top.

Figure 4:
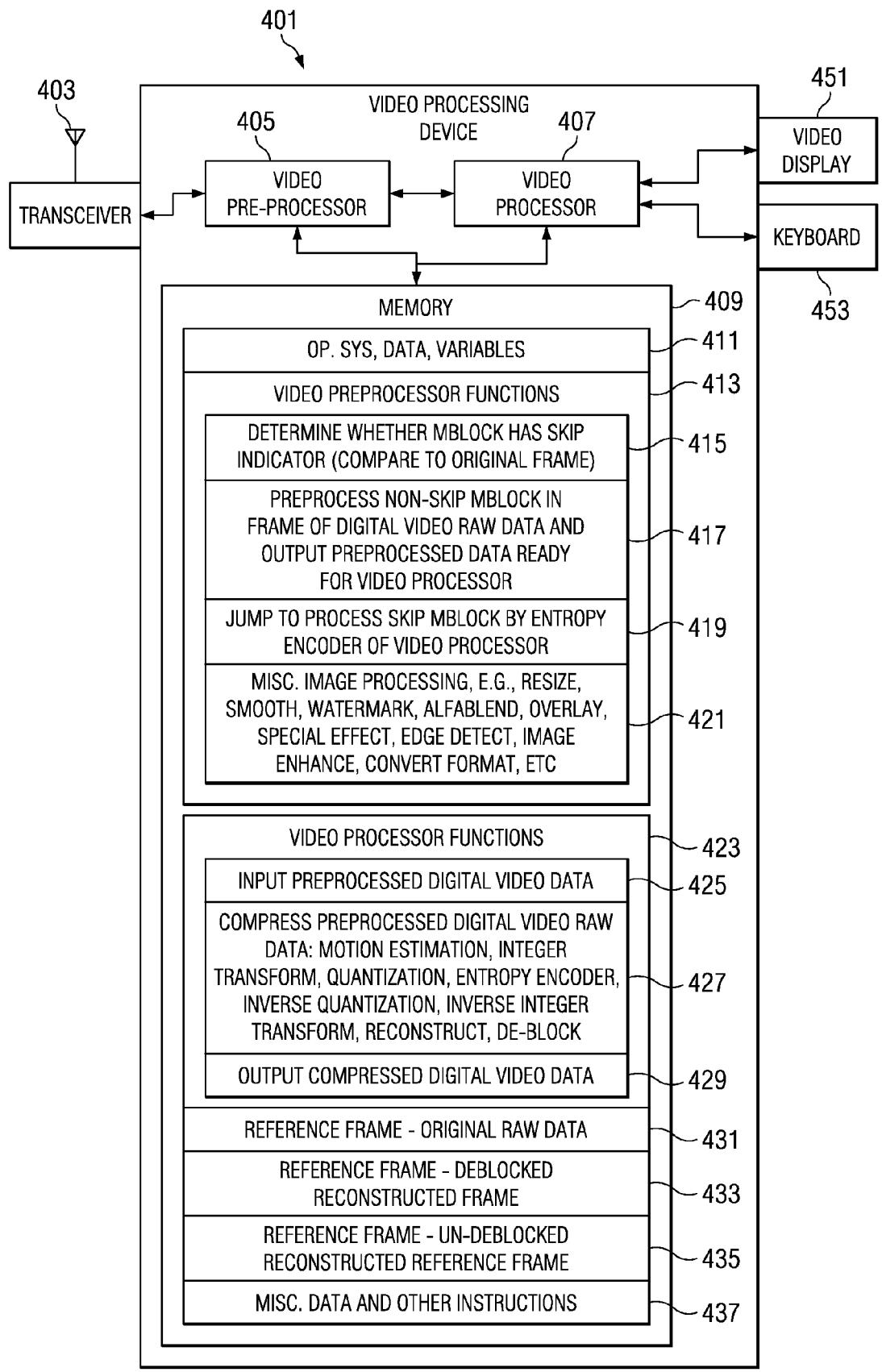
FIG. 4 is a block diagram illustrating portions of a video processing device.

Referring now to FIG. 4, a block diagram illustrating portions of a video processing device will be discussed and described. The video processing device 401 may include a transceiver 403 for communication with an external device, a video pre-processor 405, a video processor 407, a memory 409, a video display 451, and/or a user input device such as a keyboard 453.

The video display 451 may present image data from the video processor 407 to the user by way of a conventional liquid crystal display (LCD) or other visual display.

The user may invoke functions accessible through the keyboard 453, which is representative of various user input devices. The user input device may comprise one or more of various known input devices, such as a keypad, a computer mouse, a touchpad, a touch screen, a trackball, and/or a keyboard.

The transceiver 403 is representative of a receiver, a transceiver, a port or other type of connection for wireless or wired communication with a device or peripheral external or internal to the video processing device 401, which receives digital video raw data which is then processed by the video preprocessor 405.

The video pre-processor 405 and video processor 407 are separate processors, and may comprise one or more microprocessors and/or one or more digital signal processors. The memory 409 may be coupled to the video pre-processor 405 and video processor 407 and may comprise a read-only memory (ROM), a random-access memory (RAM), a programmable ROM (PROM), and/or an electrically erasable read-only memory (EEPROM); the memory 409 may be a double data rate (DDR) memory. Although the memory 409 is illustrated as shared between the processor, it will be appreciated that the memory 409 may be implemented as non-shared. The memory 409 may include multiple memory locations for storing, among other things, an operating system, data and variables 409 for programs executed by the video pre-processor 405 and video processor 407; computer programs for causing the video preprocessor to operate in connection with various pre-processor functions 413 such as determining 415 whether the macroblock has a SKIP indicator, preprocessing a non-SKIP macroblock 417, jumping 419 to process the SKIP macroblock by an entropy encoder of the video processor 407, and miscellaneous image processing 421; computer programs for causing the video processor to operate in connection with various processor functions 423 such as inputting 425 preprocessed digital video raw data, compressing 427 the preprocessed digital video raw data, and outputting 429 compressed digital video data; original preprocessed raw data stored as an original reference frame 431, a deblocked reconstructed reference frame 433, an un-deblocked reconstructed reference frame 435; and/or other instructions and miscellaneous data 437 for other information and instructions used by the video pre-processor 405 and/or video processor 407. The computer programs may be stored, for example, in ROM or PROM and may direct the video pre-processor 405 and video processor 407 in controlling the operation of the video processing device 401. The following section first discusses functions of the video pre-processor 405, following by functions of the video processor 407.

The video pre-processor 405 may be programmed to determine 415 whether a macroblock in the received digital video raw data has a SKIP indicator. This can be accomplished by checking received digital video raw data against an original reference frame that has for example, prior raw data, for example, a previous frame of data input prior to being pre-processed. Also, the SKIP can be based on an early SKIP indicator such as a threshold for processor load, so that the SKIP macroblock is processed as a SKIP when one of the processors is sufficiently busy but otherwise is processed normally as a non-SKIP macroblock. Thus, if the received macroblock is not sufficiently different from a corresponding macroblock in the reference frame, it can be omitted.

The video pre-processor 405 may be programmed to pre-process a non-SKIP macroblock 417 to generate and output preprocessed data ready for the video processor. The preprocessing can be one or more image processing algorithms which are performed to modify the visual appearance of the image as perceived by the viewer, not to be confused with the video processor functions which are used because of compressing or decompressing the image. The preprocessing algorithms can vary depending on the preferences of the producer of the video images. For example, the video images can be preprocessed to add an image overlay of the broadcaster's logo; if the video is a movie being broadcast it can be re-sized, etc. Pre-processing can include conventional techniques.

The video pre-processor 405 may be programmed to jump 419 to process the SKIP macroblock by an entropy encoder of the video processor 407. That is, the video pre-processor 405 can be programmed to not process the SKIP macroblock by the preprocessing function(s) 417, but also to cause the video processor 407 to not perform the compression functions (such as motion estimation, motion compensation, intra prediction, integer transform, and quantization) except that the video processor 407 is caused to jump to entry encode the SKIP macroblock. The video pre-processor 405 can cause the jump by bypassing the preprocessing functions 417; and causing the video processor 407 to bypass the compression-related functions up to the entropy encoding by marking the macroblock as a SKIP macroblock, by causing the video processor 407 to initiate the entropy encode for the SKIP macroblock instead of initiating the compression-related functions, or similar.

The video pre-processor 405 may be programmed for miscellaneous image processing algorithms 421. That is, the preprocessing includes conventional image processing algorithms such as, by way of example, resizing, watermark insertion, image smoothing, alpha blending—overlay, special effects, medical image enhancement, edge and/or object detection and/or enhancement. One or more of these can be selectively used for the video raw data of a video; different videos can use different combinations of image processing algorithms.

We turn now to the video processor 407.

The video processor 407 may be programmed to input 425 preprocessed digital video raw data, that is, digital video raw data which has been processed by the video preprocessor 405. The preprocessed digital video raw data can be input to the video processor 407 in accordance with known techniques.

The video pre-processor 405 may be programmed to compress 427 the preprocessed digital video raw data which is input. Compressing the digital video raw data can include conventional functions which compress the data and/or which are related because they prepare the data for compression, for example, motion estimation, motion compensation, intra prediction, integer transform, quantization, entropy encoding, as well as decoding functions such as inverse quantization, inverse integer transform and add prediction, and reconstruction and deblocking, and variations and improvements thereof.

The reconstruction and deblocking can be conventional, using a reconstructed deblocked reference frame. In a variation, the reconstruction and deblocking can use a reconstructed reference frame that did not go through de-blocking, when processing SKIP macroblocks, and otherwise uses the reconstructed deblocked reference frame for non-SKIP macroblocks.

The video pre-processor 405 may be programmed to output 429 the compressed digital video data which has been prepared, according to known techniques. For example, the compressed data can be in the format specified by the H.264 standard or in MPEG format, and variations and evolutions thereof.

It should be understood that various logical groupings of functions are described herein. Different realizations may omit one or more of these logical groupings. Likewise, in various realizations, functions may be grouped differently, combined, or augmented. Furthermore, variations can omit functions. For example, a variation of the video processing device 401 can omit the transceiver 403, can omit one or more of the image processing 421, and/or can omit the use of the un-deblocked reconstructed reference frame 435. Also, a variation of the video processing device 401 can store the original raw data reference frame 431, deblocked reconstructed reference frame 433, and/or un-deblocked reconstructed reference frame 435 outside the shared memory 409. Further, a variation of the video processing device 401 can provide a memory 409 for the video pre-processor 405 and another memory for the video processor 407, with respective functions and supporting code/memory locations stored therein. Moreover, another variation of the video processing device 401 can omit the keyboard 453 or have plural keyboards, and/or can omit the video display 451 and/or have plural video displays.

Figure 5:
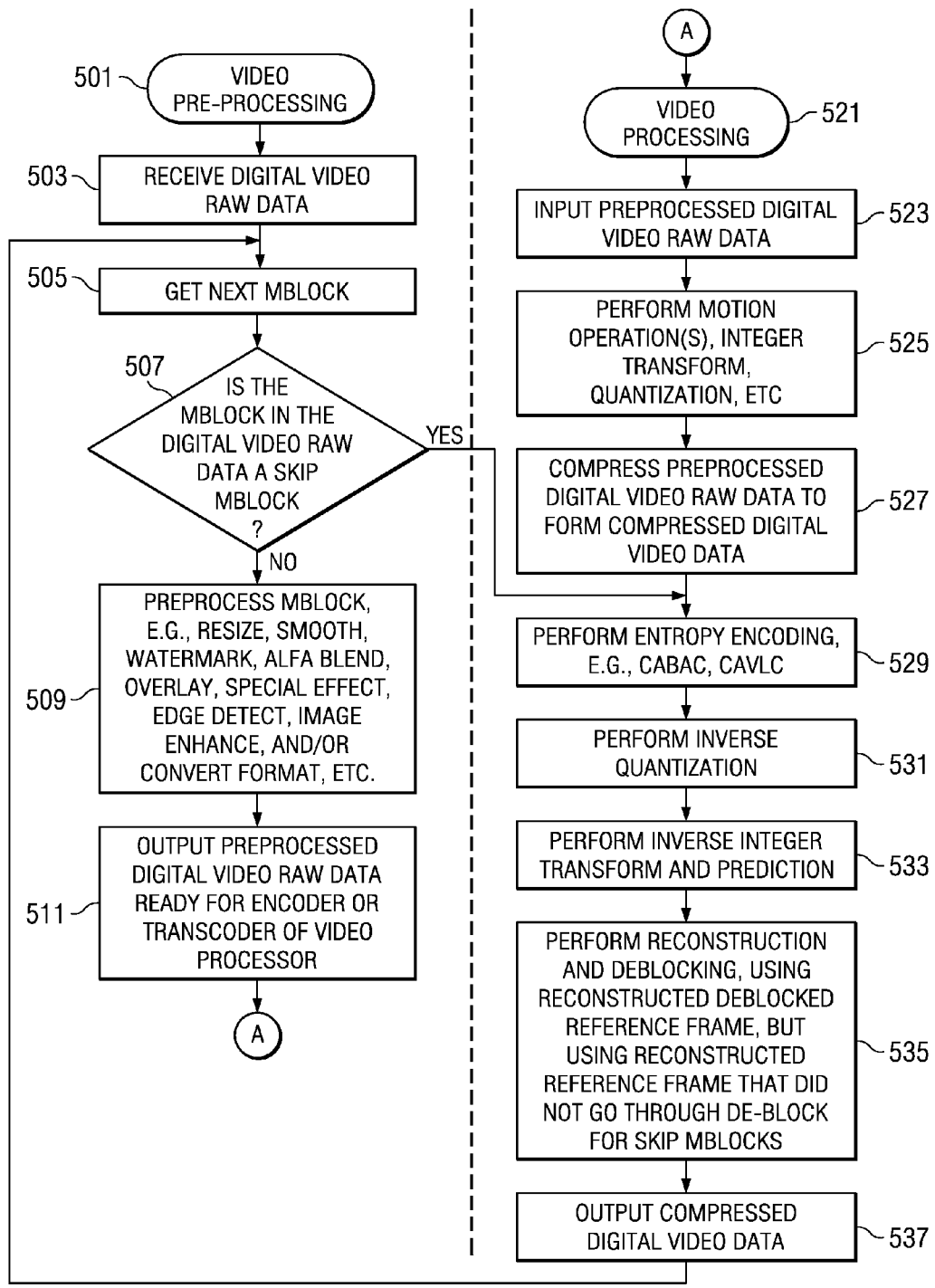
FIG. 5 is a flow chart illustrating an adaptive real-time video image procedure.

Referring now to FIG. 5, a flow chart illustrating an adaptive real-time video image procedure will be discussed and described. The adaptive real-time video image procedure can advantageously be implemented on, for example, a video preprocessor and a video processor, for example in a video processing device, described in connection with FIG. 4 or other apparatus appropriately arranged.

In overview, the video image procedure includes video preprocessing 501 and video processing 521. The video pre-processing 501 receives 503 digital video raw data, gets 505 a macroblock in the digital video raw data, preprocesses 509 a macroblock in the digital video raw data, and outputs 511 preprocessed digital video raw data; the video processing 521 inputs 523 and processes the preprocessed digital video raw data 525, 527, 529, 531, 533, 535 (including preparation for compression) and outputs 537 compressed video data. The video preprocessing 501 determines whether 507 the macroblock is a SKIP macroblock, and if it is a SKIP macroblock can bypass both the preprocessing 509 (in the video preprocessing 501) and compression related processes 525, 527 (in the video processing 521). Each of these is discussed below, although details which have been previously described above may be omitted from the following discussion.

The video preprocessing 501 receives 503 digital video raw data, as previously described. The digital video raw data is in a format which can be compressed to form compressed video data in accordance with various standards such as H.264 or MPEG (and variations and evolutions thereof). The digital video raw data is understood to include frames, each frame including macroblocks, according to known conventions.

The video preprocessing 501 gets 505 a next macroblock in the digital video raw data, and performs various preprocessing and video processing operations on the macroblock. The video preprocessing 501 and the video processing 521 loop to process the macroblocks.

As mentioned above, the video preprocessing 501 determines whether 507 the macroblock is a SKIP macroblock, in accordance with any appropriate technique. The determination of whether the macroblock is a SKIP macroblock can be performed by comparison to a reference frame which comprises original raw data that is not yet preprocessed and is not yet processed, for example, the previous frame in the received digital video raw data. If the macroblock is identical or sufficiently identical to the macroblock in the reference frame, then this macroblock likely will not be included in the compressed data anyway and therefore can be omitted. Thus, if the macroblock is a SKIP macroblock, the adaptive real-time video image procedure can bypass both the preprocessing 509 (in the video preprocessing 501) and compression related processes 525, 527 (in the video processing 521) and hence jumps to perform 529 entropy encoding of the macroblock.

However, when the macroblock is not a SKIP macroblock, the video preprocessing 501 preprocesses a macroblock in the digital video raw data 509 as discussed above. The preprocessing 509 can be, for example, one or more of resizing, smoothing, watermarking, alfa blending, overlaying, inserting special effects, edge detection, image enhancement, and/or converting the data format. Then, the video preprocessing 501 outputs 511 preprocessed digital video raw data ready for the video processing 521.

The video processing 521 inputs 523 the preprocessed digital video raw data which is ready to be prepared for compression and then compressed. To prepare for compression, the video processing 521 can perform 525 motion operation(s), integer transform, quantization, and the like on the preprocessed digital video raw data. These can be known techniques, and variations thereof. The video processing 521 compresses 527 the digital video raw data from the video preprocessing 501 to form compressed digital video data, using known techniques and/or variants and evolutions thereof. Note that this processing is bypassed for the SKIP macroblock.

Having bypassed the compression related processing for SKIP macroblocks, the video processing 521 then performs the following processing for SKIP and non-SKIP macroblocks. The video processing 521 performs 529 entropy encoding such as CABAC, CAVLC, and/or VLC on the compressed digital video data.

The video processing 521 performs 531 inverse quantization, performs 533 inverse integer transform and prediction, and performs 535 reconstruction and deblocking on the compressed digital video data to form a reconstructed, deblocked frame. Collectively, these are sometimes referred to as "decoding." These can be known procedures, and variants and evolutions thereof. However, in comparison to known techniques, one variation hereof provides that the inverse integer transform and add prediction uses an undeblocked reconstructed reference frame, that is, the reference frame which is used by the inverse integer transform and add prediction is after the reconstruction but before the frame is deblocked.

The video processing 521 can output 537 compressed video data, in accordance with known techniques and video compression standards. For example, the compressed video data can be in H.264/MPEG-4 compatible format. The output compressed video data can be provided to a display device for displaying a video to a viewer.

The method may be embodied as computer program instructions stored on a non-transitory computer-readable medium, the instructions being executable by a computer, for example a removable or non-removable computer memory storage; and/or the method may be embodied in integrated circuits (ICs), such as a digital signal processor and software therefore, and/or application specific ICs It should be noted that the term video processing device may be used interchangeably herein with video unit, video device or the like. Each of these terms denotes a device that is equipped to receive digital video raw data, perhaps wirelessly or from a wired connection or from a tangible digital storage medium, ordinarily associated with a video intended to be coded, compressed, decompressed, decoded, and then displayed for viewing by a viewer. Examples of such units include personal computers, digital television sets, video conferencing systems, personal digital assistants, surveillance systems, cellular handsets or devices, network servers, network gateways, media servers, and digital set up boxes, or equivalents thereof provided such units are arranged and constructed for video encoding or video transcoding, to include video compression.

The video compression of interest herein includes block-oriented codec standards, some of which can include motion-compensation, such as the ITU-T H.264 standard (sometimes referred to herein as "H.264") and the ISO/IEC MPEG-4 standard (sometimes referred to herein as "MPEG") (also known as ISO/IEC 14496-10—MPEG-4 Part 10), which can be used in connection with video, for example Blu-ray Disc, videos from YouTube and/or iTunes Store, digital video broadcast service, direct-broadcast satellite television service, cable television service, videoconferencing, audio-visual data for web (sometimes referred to as "streaming media"), compact disk, videophone, and broadcast television, and variants and evolutions thereof.

The term "digital video raw data" is used herein to indicate digital video data that is un-processed, i.e., before processing, compression and the like, and generally will be processed row-by-row in one still image, frame, or picture of a video which includes many still images, frames, or pictures to compose the complete video; digital video raw data can be pixels, for example, in YUV format, variants and evolutions thereof.

The term "digital video data" is used herein to indicate digital data that generally represents at least a part of a video which includes many still images to compose the complete video; digital video data can be pixels, for example, in YUV format, variants and evolutions thereof.

The term "frame" is used herein to indicate the information representing just one of the still images which compose the complete video, and which can be represented as an array of picture elements (for example, color and luminance) and/or motion vectors, as may be further defined in standards such as MPEG1/2/4/7/H.264/VC-1/AVS, variants and evolutions thereof.

The term "reference frame" is used herein to indicate a frame of digital video data which is stored and then used to compare to one or more subsequent frames to determine whether processing can be omitted because the subsequent frame (or a macro block therein) is sufficiently similar so that processing the subsequent frame (or the macroblock therein) will substantially duplicate the processing on the reference frame (or the macroblock therein), as may be further defined in standards such as MPEG1/2/4/7/H.264/VC-1/AVS, variants and evolutions thereof.

The term "macroblock" is used herein to indicate a region of predefined size within a frame, sometimes called a "mblock", and is typically 16×16 grouping of pixels, as may be further defined in standards such as MPEG1/2/4/7/H.264/VC-1/AVS, variants and evolutions thereof.

The term "SKIP" is used herein to indicate a mode, sometimes referred to as "SKIP mode" in which processing for a macroblock can be bypassed; a "SKIP macroblock" is a term that indicates a macroblock for which processing can be bypassed because the bits can be deduced from previous and/or subsequent macroblocks, the SKIP typically being indicated in the macroblock by a SKIP indicator; the terms "SKIP," "SKIP mode", "SKIP indicator" may be further defined in standards such as MPEG1/2/4/7/H.264/VC-1/AVS, variants and evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A video processing device, comprising:
   a video processor configured to facilitate:
   inputting preprocessed digital video data ready for further processing by an encoder or a transcoder,
   compressing the preprocessed digital video data to form compressed digital video data, and
   outputting the compressed digital video data; and
   a video preprocessor operable to receive digital video raw data, configured to facilitate:
   preprocessing a macroblock of the digital video raw data so as to output the preprocessed digital video data ready for an encoder or transcoder of the video processor when the macroblock does not indicate SKIP, and
   not preprocessing the macroblock of the digital video raw data when the macroblock is a SKIP macroblock indicating SKIP, but jumping to process the SKIP macroblock by an entropy encoder of the video processor instead.

2. The video processing device of claim 1, wherein the video preprocessor is configured to jump to process the SKIP macroblock by the entropy encoder before any image processing operation is applied thereto.

3. The video processing device of claim 1, the SKIP indicator having an adaptive threshold, so as to jump to process the SKIP macroblock only when the video processor requires more resources than the video preprocessor.

4. The video processing device of claim 1, wherein original preprocessed raw data is used by the video preprocessor as an original reference frame to determine whether the macroblock in the digital video raw data is the SKIP macroblock.

5. The video processing device of claim 1, wherein the video processor performs reconstruction and de-blocking of the preprocessed digital video data to provide compressed digital video data, and a reconstructed but un-deblocked reference frame is used instead of a deblocked reconstructed reference frame to perform deblocking filtering for SKIP macroblocks.

6. The video processing device of claim 1, using a de-blocked and reconstructed reference frame to perform a motion estimation operation.

7. A method for processing a video image, comprising:
   in a video processor,
   inputting preprocessed digital video data ready for further processing by an encoder or a transcoder,
   compressing the preprocessed digital video data to form compressed digital video data, and
   outputting the compressed digital video data; and
   in a video preprocessor operable to receive digital video raw data,
   preprocessing a macroblock of the digital video raw data so as to output the preprocessed digital video data ready for an encoder or transcoder to the video processor when the macroblock does not indicate SKIP, and
   not preprocessing the macroblock of the digital video raw data when the macroblock is a SKIP macroblock indicating SKIP, but jumping to process the macroblock by an entropy encoder of the video processor instead.

8. The method of claim 7, further comprising jumping to process the SKIP macroblock by the entropy encoder before any image processing operation is applied thereto.

9. The method of claim 7, the SKIP indicator having an adaptive threshold so as to jump to process the SKIP macroblock only when the video processor requires more resources than the video preprocessor.

10. The method of claim 7, further comprising using original preprocessed raw data as an original reference frame to determine whether the macroblock in the digital video raw data is the SKIP macroblock.

11. The method of claim 7, further comprising reconstructing and de-blocking the preprocessed digital video data to provide compressed digital video data, and using a reconstructed but un-deblocked reference frame instead of a deblocked reconstructed reference frame to perform deblocking filtering for SKIP macroblocks.

12. The method of claim 7, further comprising using a de-blocked and reconstructed reference frame to perform a motion estimation operation.

13. An apparatus configured to perform the method of claim 7.

14. A non-transitory computer readable medium comprising executable instructions for performing the method of claim 7.

15. A non-transitory computer-readable medium comprising instructions for execution by a computer, the instructions including a computer-implemented method for processing a video image, the instructions for implementing:
   in a video processor,
   inputting preprocessed digital video data ready for further processing by an encoder or a transcoder,
   compressing the preprocessed digital video data to form compressed digital video data, and
   outputting the compressed digital video data; and
   in a video preprocessor operable to receive digital video raw data, preprocessing a macroblock of the digital video raw data so as to output the preprocessed digital video data ready for an encoder or transcoder to the video processor when the macroblock does not indicate SKIP, and not preprocessing the macroblock of the digital video raw data when the macroblock is a SKIP macroblock, but jumping to process the macroblock by an entropy encoder of the video processor instead.

16. The computer-readable medium of claim 15, further comprising instructions for jumping to process the SKIP macroblock by the entropy encoder before any image processing operation is applied thereto.

17. The computer-readable medium of claim 15, the SKIP indicator having an adaptive threshold, further comprising instructions to jump to process the SKIP macroblock only when the video processor requires more resources than the video preprocessor.

18. The computer-readable medium of claim 15, further comprising instructions for using original preprocessed raw data as an original reference frame to determine whether the macroblock in the digital video raw data is the SKIP macroblock.

19. The computer-readable medium of claim 15, further comprising instructions for reconstructing and de-blocking the preprocessed digital video data to provide compressed digital video data, and using a reconstructed but un-deblocked reference frame instead of a deblocked reconstructed reference frame to perform deblocking filtering for SKIP macroblocks.

20. The computer-readable medium of claim 15, further comprising instructions for using a de-blocked and reconstructed reference frame to perform a motion estimation operation.

* * * * *